United States Patent [19]

Yamazoe

[11] Patent Number: 5,232,275
[45] Date of Patent: Aug. 3, 1993

[54] DISC RACK WITH HOLDERS WHICH REST IN A DIFFERENT POSITION WHEN UNLOADED THAN WHEN LOADED

[75] Inventor: Hajime Yamazoe, Hyogo, Japan
[73] Assignee: Sakae Masumoto, Osaka, Japan
[21] Appl. No.: 477,862
[22] PCT Filed: Aug. 24, 1988
[86] PCT No.: PCT/JP88/00838
    § 371 Date: Apr. 4, 1990
    § 102(e) Date: Apr. 4, 1990
[87] PCT Pub. No.: WO90/02404
    PCT Pub. Date: Mar. 8, 1990
[51] Int. Cl.[5] .................. A47B 81/06; A47F 1/04; G11B 33/02
[52] U.S. Cl. .................. 312/9.58; 369/36; 312/9.42
[58] Field of Search .......... 369/36, 37, 38, 178, 369/75.2; 360/133, 98.06; 312/10, 11, 13, 14

[56] References Cited

U.S. PATENT DOCUMENTS

| | | | |
|---|---|---|---|
| 2,616,706 | 11/1952 | Maurer | 369/36 |
| 2,647,027 | 7/1953 | Wallach | 312/13 |
| 3,042,469 | 7/1962 | Lowther | 312/13 |
| 3,316,039 | 4/1967 | Drobny | 312/13 |
| 3,391,792 | 7/1968 | Makar | 312/13 |
| 4,875,743 | 10/1989 | Gelardi et al. | 312/13 |

FOREIGN PATENT DOCUMENTS

63-40892 3/1988 Japan .

*Primary Examiner*—Eugene R. LaRoche
*Assistant Examiner*—Michael C. Kessell
*Attorney, Agent, or Firm*—Jordan and Hamburg

[57] ABSTRACT

A disc rack capable of supporting holder members for holding a disc in such a way that the holder members are turnable about a supporting rod (3) from a drawn-out position to a retracted position and vice versa, including a positioning member able to come into contact with a circumferential portion of a disc loaded in a holder member when the holder member, is put in the retracted position, to keep the holder member loaded with the disc at a rotation angle different from that of a holder member (1) not loaded with a disc. This disc rack makes it possible to easily confirm whether or not the holder member is loaded with a disc without providing an additional indicator.

5 Claims, 7 Drawing Sheets

DISC RACK WITH HOLDERS WHICH REST IN A DIFFERENT POSITION WHEN UNLOADED THAN WHEN LOADED

TECHNICAL FIELD

The present invention relates to a disc rack for containing disc type record plates or the like, such as audio discs or video discs.

BACKGROUND ART

As shown in Unexamined Japanese Utility Model Publication No. 59-39475, a conventional disc rack from which a desired disc can be easily taken out comprises a plurality of holders having a pair of nippers. The holders are arranged in parallel and placed in a box-type container having an opening at the front part. Rotating the holders about the supporting rod, the holders can be taken out of the container. In the disc container, indication levers have an end swinging when an opposite end is pushed by the circumferential portion of a disc. The levers are used to detect and indicate whether a contained holder holds a disc. In this structure, the levers can not be activated smoothly if indicating levers are not accurately assembled. This is likely to cause malfunction and therefore a problem that levers can not precisely indicate whether a disc is held or not.

The present invention, having overcome the above problem, has an object of providing a disc rack with a simple structure which makes it possible to precisely indicate whether or not a disc is held.

DISCLOSURE OF THE INVENTION

According to the present invention, a disc rack comprising a plurality of holder members for holding a disc in a vertical direction, a supporting frame for supporting the holder member in such a way that the holder member is turnable about a supporting rod from a drawn-out position to a retracted position and vice versa, a positioning member able to come into contact with a circumferential portion of a disc loaded in a holder member when the holder member is put in the retracted position for positioning the holder member being loaded with the disc at an angle different from that of a holder member not being with a disc.

According to the present invention, also, the positioning member able to come into contact with a circumferential portion of a disc loaded in a holder member being attached to an attachment portion provided on a back plate of the supporting frame.

According to the present invention, further, a top plate of the supporting frame is provided with a guide member having a guide portion for guiding the holder member when the holder member is turned, the positioning member able to come into contact with a circumferential portion of a disc loaded in a holder member being provided at aback end of the guide member.

According to the present invention, further more, the positioning member is able to come into contact with a disc loaded in a holder member so that a front surface of the holder member comes in agreement with a front surface of the supporting frame when the holder member is put in retracted position, and a slide portion is provided on the holder member, the slide portion being able to come into contact with the positioning member so that an upper portion of the holder member is positioned inside of the supporting frame with the holder member being inclined when the holder member is not loaded with a disc and put in the retracted position.

According to the present invention, yet furthermore, the holder member has a bottom portion able to come into contact with a bottom plate of the supporting frame so that an upper portion of the holder member is positioned inside of the supporting frame with the holder member being inclined when the holder member is not loaded with a disc and put in the retracted position.

BEST MODE FOR CARRYING OUT THE INVENTION

Figure 1:
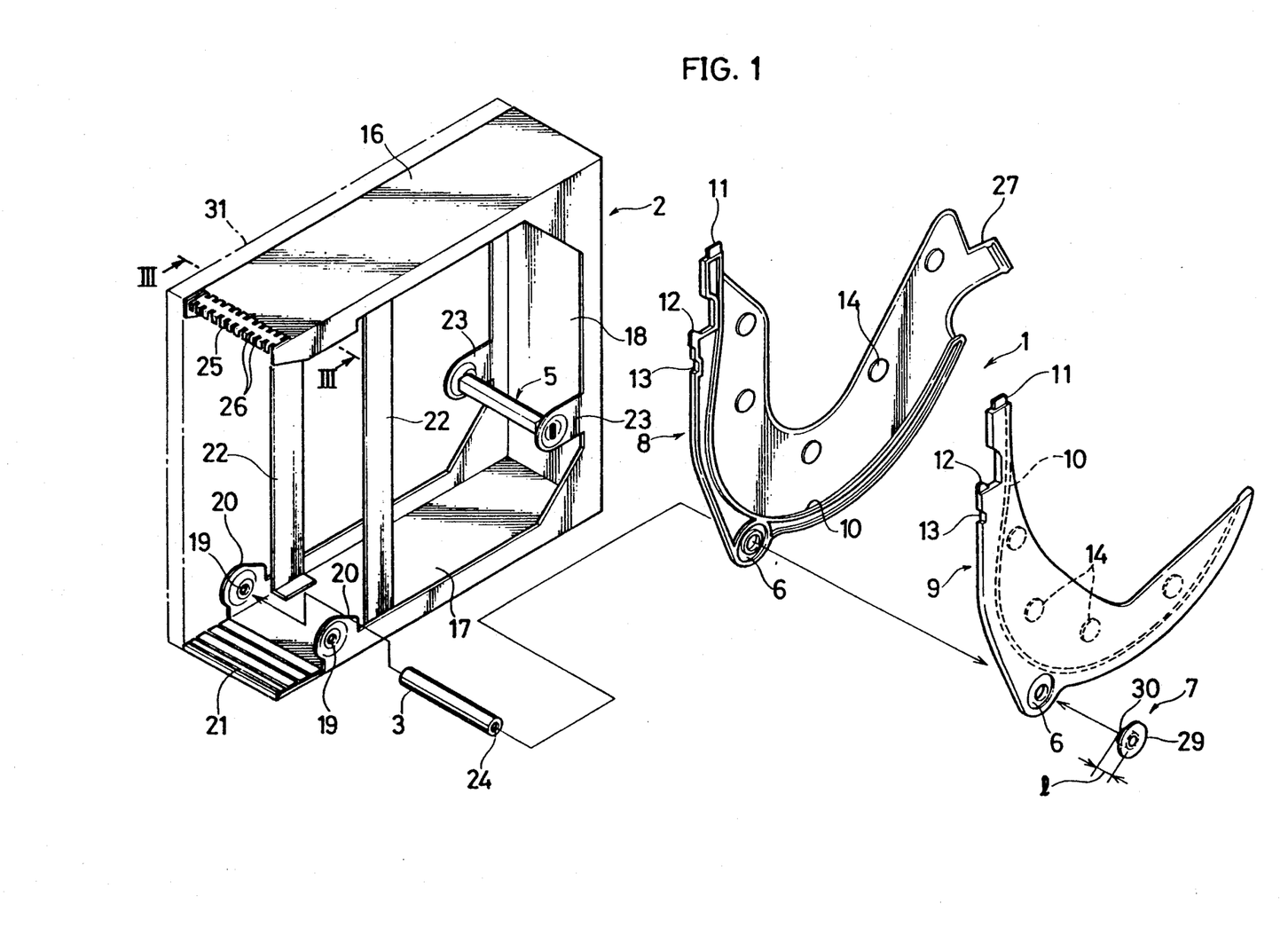
FIG. 1 is an exploded perspective view illustrating a disc rack according to the present invention.

FIG. 1 shows a holder unit of a disc rack according to the present invention. The holder unit comprises a holder member 1 for holding a disc, a supporting frame 2 for rotatably supporting the holder member 1, a supporting rod 3 on which the holder member 1 rotates, a guide member 4 attached to a top end of the supporting frame 2, a positioning member 5 provided in a rear portion of the supporting frame 2 and a spacer 7 attached to a rotational holding portion 6 of the holder member 1.

The holder member 1 comprises a pair of side plates 8, 9 mated with each other. The side plates 8, 9 have in their respective inner faces circumferential walls 10 corresponding to the circumferential portion of a disc, which form a holding portion for holding a disc. Projections 11 are provided on top ends of the side plates 8, 9. As stated below, the projection 11 comes in contact with a stopper 25 of the guide member 4 so that the holder member 1 may not leap out from the supporting frame. Another projection 12 is formed before and below the projection 11 and used to draw out the holder member 1. The holder 1 has a notch 13 below the projection 12. The notch 13 is used to receive numerical indications for holder members. The side plates 8, 9 have in their respective inner faces disc-like shock absorbers 14 made of a soft material such as sponge rubber or felt at a regular interval to protect the plate faces of a disc.

Figure 2:
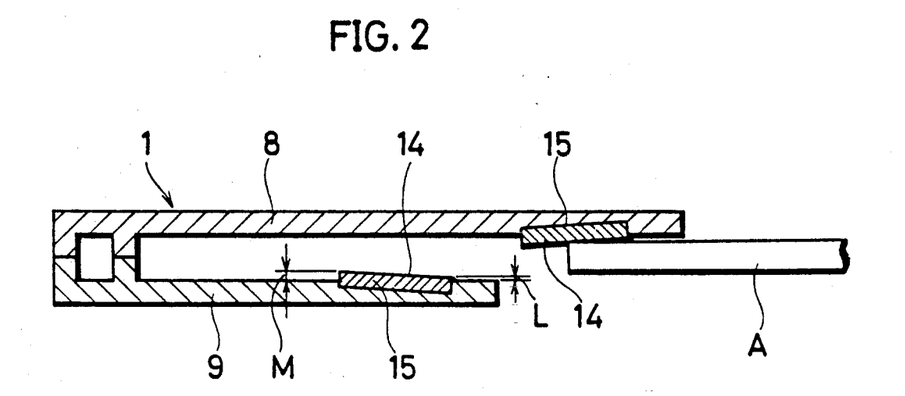
FIG. 2 is a sectional view illustrating a mounting state of shock absorbers.

As shown in FIG. 2, the shock absorbers 14 have their bottom portion stuffed in recesses 15 formed in the side plates 8, 9 and bonded with an adhesive agent or the like. The bottom of the recess 15 is tapered in such a way that its depth becomes gradually larger from a disc insertion portion to a back portion. Accordingly, a projecting amount M of the shock absorber 14 in the disc insertion portion is larger than that L in the back portion.

The supporting frame 2 includes a top plate 16, a bottom plate 17 and a back plate 18, each having reinforcing flaps the opposite sides. The supporting frame is generally U-shaped and having a space capable of containing a predetermined number of holder members 1. Supporting portions 20 with apertures 19 for holding the supporting rod 3 are formed in the opposite flaps of the bottom plate 17. A cover 21 is attached on the front end of the bottom plate 17.

Reinforcing connection members 22 are attached to side portions of the top plate 16 and the bottom plate 17. Mounting portions 23 are projected from the back plate 18 to hold the positioning member 5. The positioning member 5, as stated below, receives a circumferential portion of a disc to prevent the disc from receding farther when the holder member 1 loaded with disc is retracted, so that the holder member 1 can be held at a predetermined angle.

The supporting rod 3 has a length equal to the distance between the supporting portions 20 of the supporting frame 2. Opposite ends of the supporting rod 3 have screw holes 24 to which mounting bolts (not shown) are screwed. After the supporting rod 23 is mounted with a predetermined number of holder members 1 and spacers 7, the mounting bolts are inserted to the apertures 19 of the supporting frame 2 and screwed to the screw holes 24. In this way, the supporting rod 3 carrying the holder members 1 is attached to the supporting frame 2.

Figure 3:
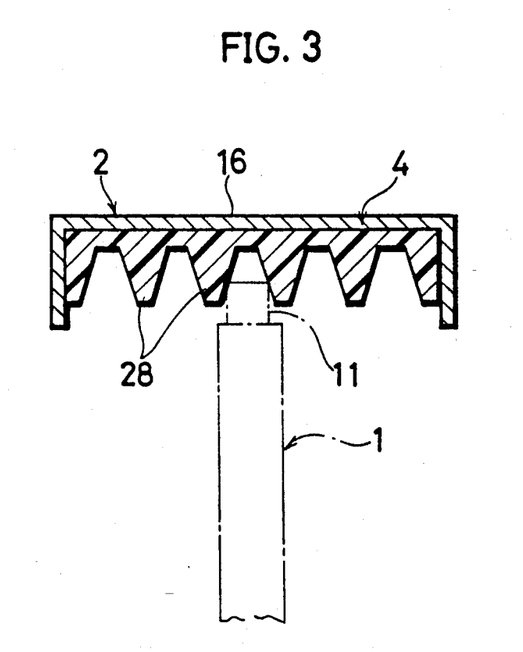
FIG. 3 is a sectional view taken along the line III—III in FIG. 1.
Figure 4:
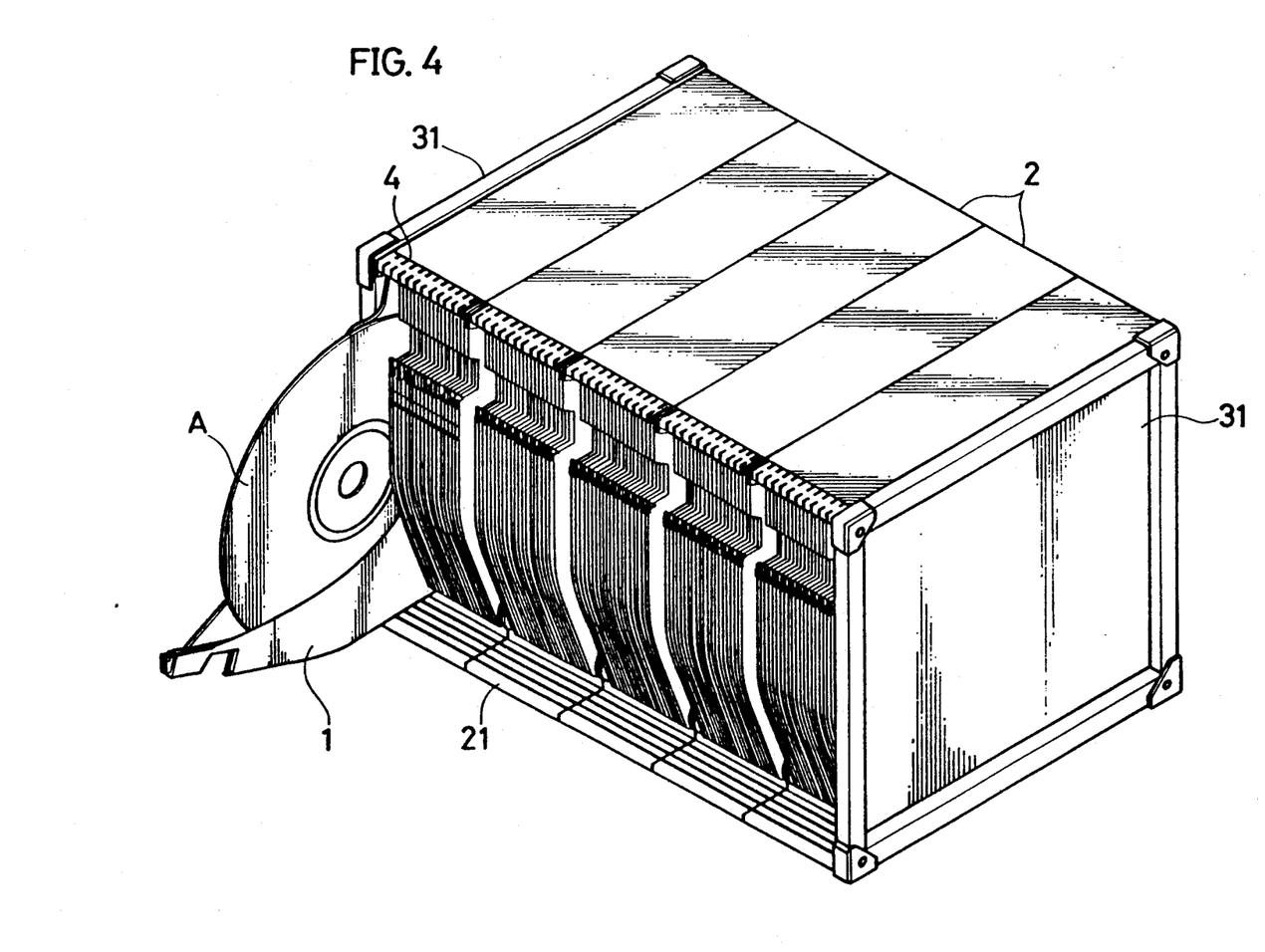
FIG. 4 is a perspective view illustrating the assembled disc rack.

The guide member 4 is attached to the front end of the top plate 16 of the supporting frame 2. A front portion of the guide member 4 has a plurality of stoppers 25 disposed in a widthwise direction of the rack with notches 26 therebetween. The stopper 25 comes in contact with the projection 11 when the holder member 1 is drawn out and in so as to keep the holder member 1 in the retracted position. As shown in FIG. 3, the guide member 4 has on its underside a plurality of guides 28 projecting at a regular interval for guiding a sliding portion 27 formed in a rear portion of the holder member 1 and a circumferential portion of the disc when the holder member 1 is drawn out and in.

The spacer 7 includes a flange 29 and a boss 30. The boss 30 has a full length of l larger than the thickness of the holder member 1, so that there exists a predetermined gap between adjacent holder members 1 when the disc rack is assembled.

Figure 5:
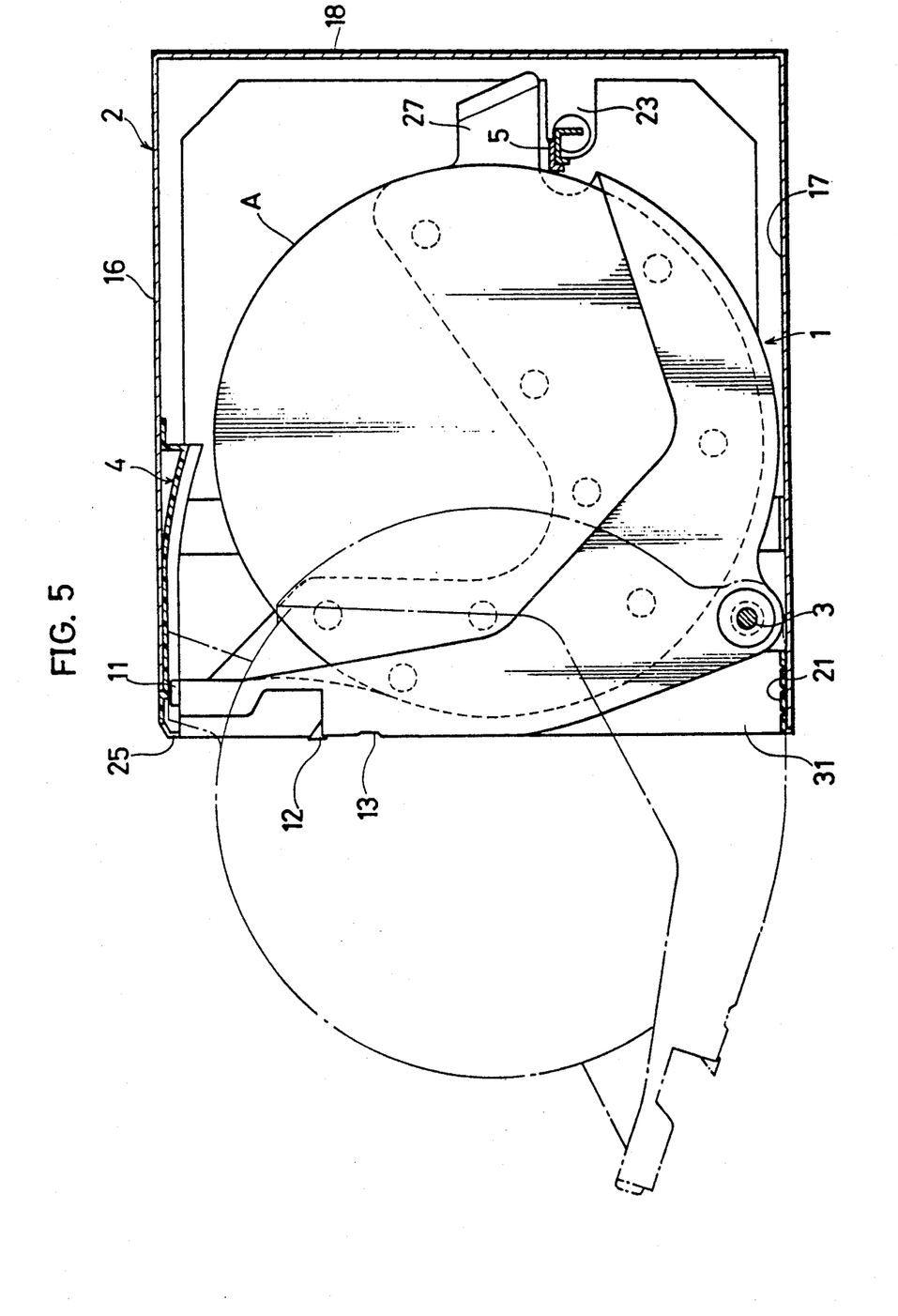
FIG. 5 is a sectional view illustrating a holder member being loaded with a disc.

A plurality of holder units are laterally connected and a pair of side walls 31 made of a decorative panel or the like are attached to the opposite sides of the connected holer units. Consequently, a disc rack is completed. In the assembled disc rack, a holder member 1 holding a disc A rotates about the supporting rod 3, that is, it moves from the drawn-out position drawn out before the supporting frame 2 as shown with a phantom line in FIG. 5 to the retracted position retracted within the supporting frame 2 as shown with a solid line and vice versa. When the holder member 1 is retracted holding the disc A, the positioning member 5 receives a circumferential portion of the disc A. As a result, the front surface of the holder member 1 is kept in agreement with that of the supporting frame 2.

Figure 6:
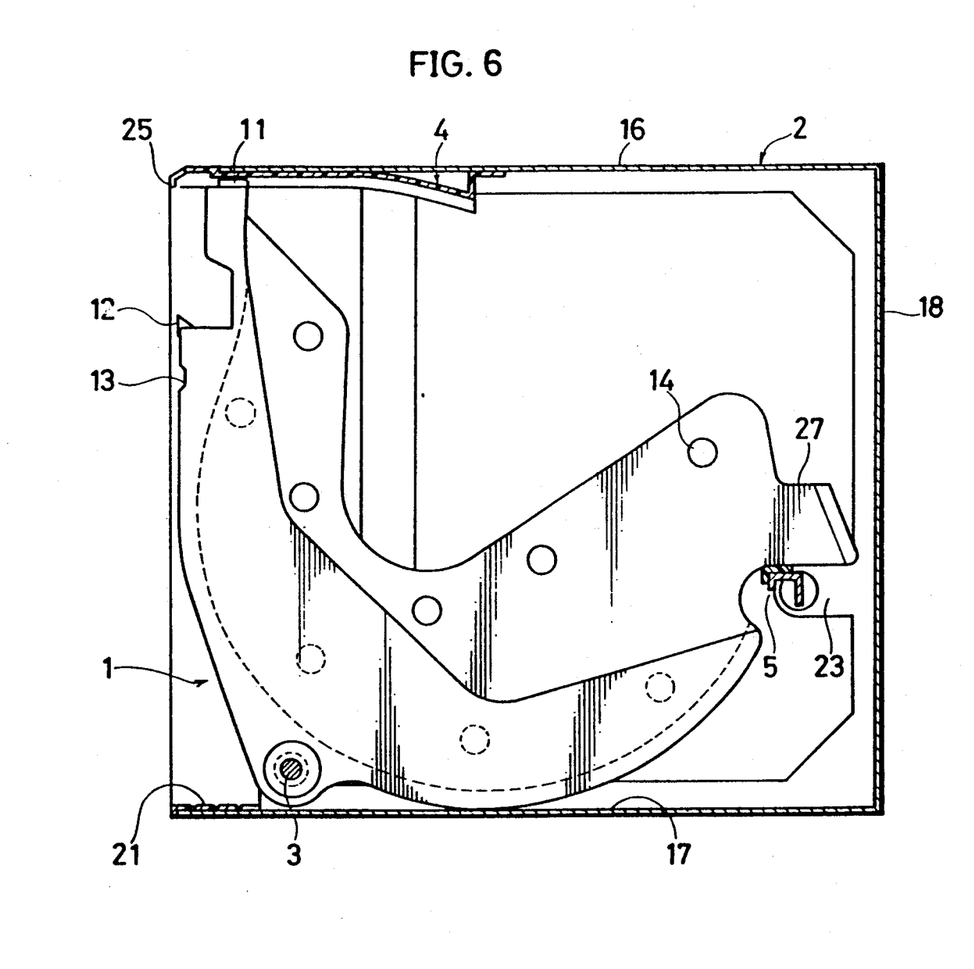
FIG. 6 is a sectional view illustrating a holder member being loaded with no disc.

On the other hand, when the holder 1 is retracted without holding the disc A as shown in FIG. 6, a bottom portion of the holder member 1 comes into contact with the bottom plate 17 of the supporting frame 2, or the holder member 1 is turned until the sliding portion 27 of the holder member 1 comes into contact with the positioning member 5. In the latter case, the upper portion of the holder member 1 reaches a position closer to the back plate 18, with the holder member 1 itself slanting backward, compared with the case in which the holder member 1 is retracted holding the disc A. The holder member 1 holding the disc A is kept at an angle different from an angle at which the holder member 1 has no disc. Accordingly, even when the holder member 1 is retracted in the disc rack, it can be instantaneously noticed whether the holder member 1 is holding a disc or not. Consequently, there is no need to provide an extra indicator such as an indication lever for indicating whether a disc is held or not. This leads to a disc rack having a simplified structure.

In the above embodiment, the projecting amount of the shock absorber 14 attached to the side plates 8, 9 of the holder member 1 gradually becomes larger from the projection L at the disc insertion portion to the projection M at the back portion. Thus, a circumferential portion of the disc does not touch the outer surface of the shock absorber 14 when the disc is inserted into the holder member 1, and the disc can be smoothly inserted along the surface of the shock absorber 14. Accordingly, any shock absorber 14 falling off the side plates 8, 9 can be effectively avoided even when a disc is repeatedly inserted and withdrawn. Additionally, the embodiment is advantageous in that direct contact of the plate surface of the disc with the inner surface of the side plates 8, 9 is avoided, thereby protecting the disc.

Figure 7:
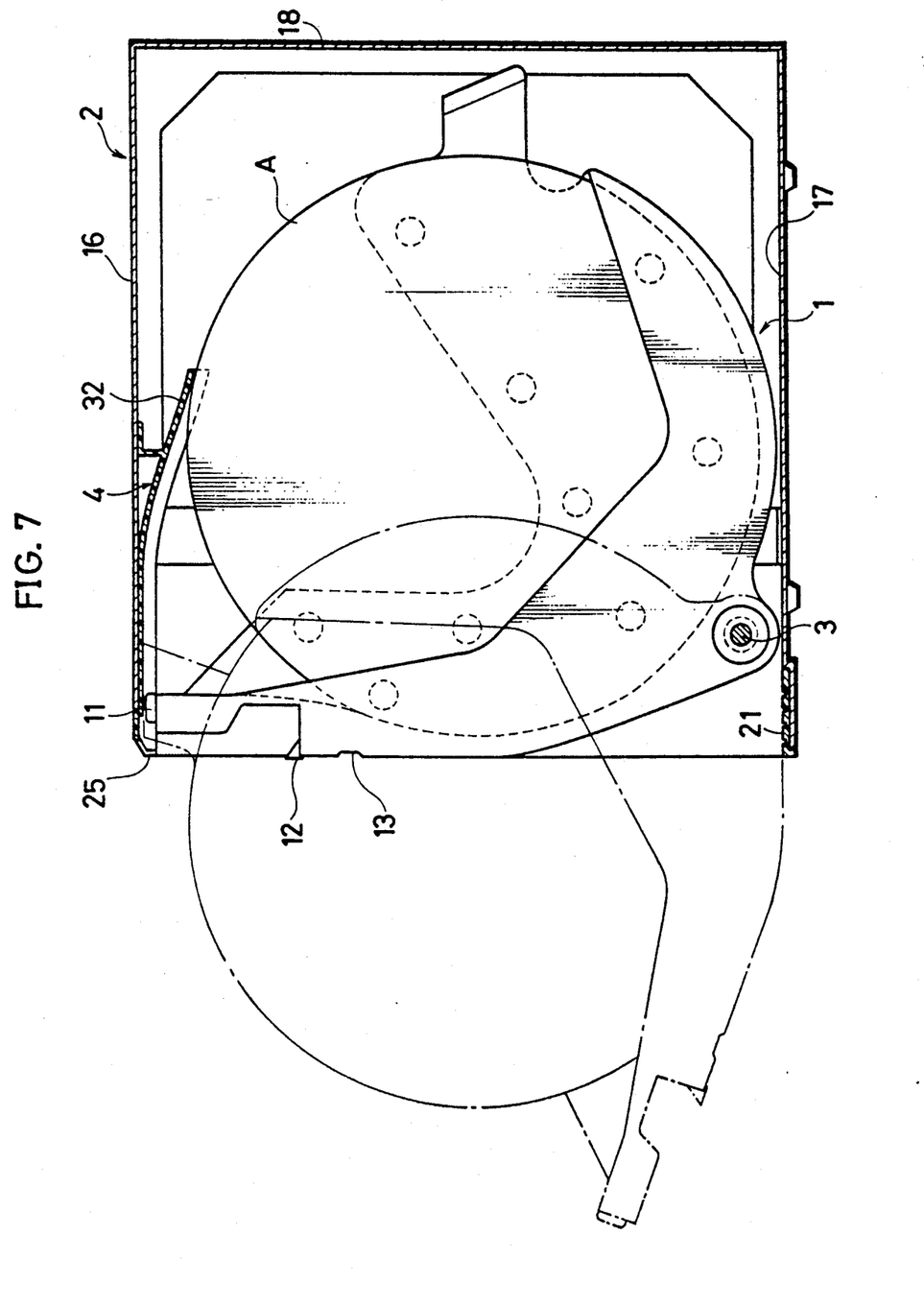
FIG. 7 is a sectional view of another disc rack of the present invention illustrating a holder member being loaded with a disc.

In the above embodiment, the positioning member 5 is attached to the mounting members 23 projecting from the back plate 18 of the supporting frame 2, and the positioning member 5 receives the circumferential portion of the disc inserted into the holder member 1, so that the holder member 1 holding the disc is kept at a predetermined angle different from that of the holder member holding no disc. In addition, as shown in FIG. 7, a positioning member 32 which makes contact with a circumferential portion of a disc may be provided in a rear portion of the guide member 4 so that the holder member 1 holding the disc is kept at a predetermined angle by the positioning member 32.

Figure 8:
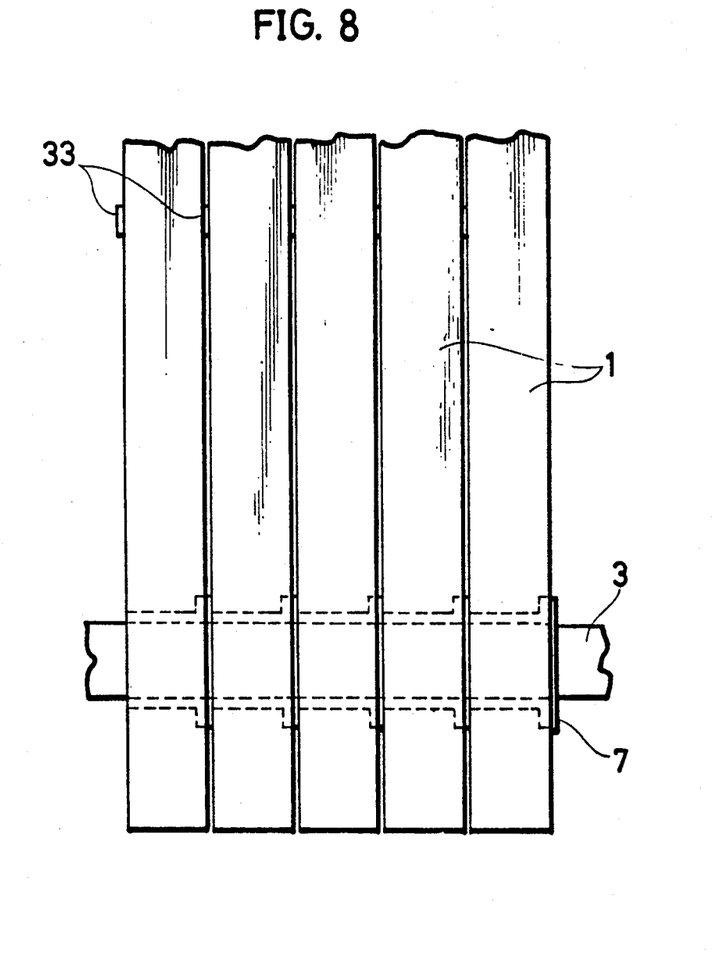
FIG. 8 is a partial front view of still another disc rack of the present invention.

Further, as shown in FIG. 8, a projection 33 may be provided on a side of a holder member which is able to come in contact with the next holder member 1 when drawing out and in. This is advantageous in that interference between holder members 1 is avoided when the holder member 1 is drawn out and in. Consequently, a trouble that drawing-out and in of the holder member 1 becomes difficult because a side plate of one of the holder members 1 intercepts that of the other or the disc can be effectively avoided.

EXPLOITABILITY IN INDUSTRY

A disc rack according to the present invention is provided with a positioning member able to come into contact with a circumferential portion of a disc loaded in a holder member when the holder member is put in the retracted position for positioning the holder member, so that the holder holding the disc is kept at an angle different from that the holder member holding no disc. Accordingly, the present invention makes it possible to instantaneously notice whether the holder member is loaded with a disc or not by a simplified construction without an extra indication member.

I claim:

1. A disc rack comprising a plurality of holder members (1) for holding a disc (A) in a vertical direction, a supporting frame (2) for supporting the holder member (1) in such a way that the holder member (1) is turnable about a supporting rod (3) from a drawn-out position to a retracted position and vice versa, a positioning member means operable to come into contact with a circumferential portion of the disc (A) loaded ion a holder member (1) when the holder member (1) is put in the retracted position and therefor positioning the holder member (1) loaded with the disc (a) at a rotation angle different from that a holder member (1) not loaded with a disc (A).

2. A disc rack according to claim 1 comprising attachment means attaching the positioning member means (5) to an attachment portion (23) provided on a back plate (18) of the supporting frame (2).

3. A disc rack according to claim 1 wherein a top plate (16) of the supporting frame (2) is provided with a guide member (4) having a guide portion (28) for guiding the holder member (1) when the holder member (1) is turned, the positioning member means (32) being provided at a back end of the guide member (4).

4. A disc rack according to claim 2 wherein the positioning member means (5) is operable to come into contact with a disc (A) loaded in a holder member (1) so that a front surface of the holder member (1) comes in agreement with a front surface of the supporting frame (2) when the holder member (1) is put into retracted position, and a slide portion (27) is provided on the holder member (1), the slide portion (27) being operable to come into contact with the positioning member means (5) so that an upper portion of the holder member (1) is positioned inside of the supporting frame (2) with the front surface of the holder member (1) being inclined with respect to one front surface of the support frame when the holder member (1) is not loaded with a disc (A) and put in the retracted position.

5. A disc rack according to claim 2 or 3 wherein the positioning member means is operable to come into contact with a disc (A) loaded in a holder member (1) so that a front surface of the holder member (12) comes in agreement with a front surface of the supporting frame (2) when the holder member (1) is put in retracted position while loaded with the disc, and the holder member (1) has a bottom portion able to come into contact with a bottom plate (17) of the supporting frame (2) so that an upper portion of the holder member (1) is positioned inside of the supporting frame (2) with the front surface of the holder member (1) being inclined with respect to the front surface of the support frame when the holder member (1) is not loaded with a disc (A) and put in the retracted position.

* * * * *